May 12, 1970  D. C. KRAMER  3,510,924
TROWELING PLASTER DELIVERY APPARATUS
Filed March 21, 1967  2 Sheets-Sheet 2
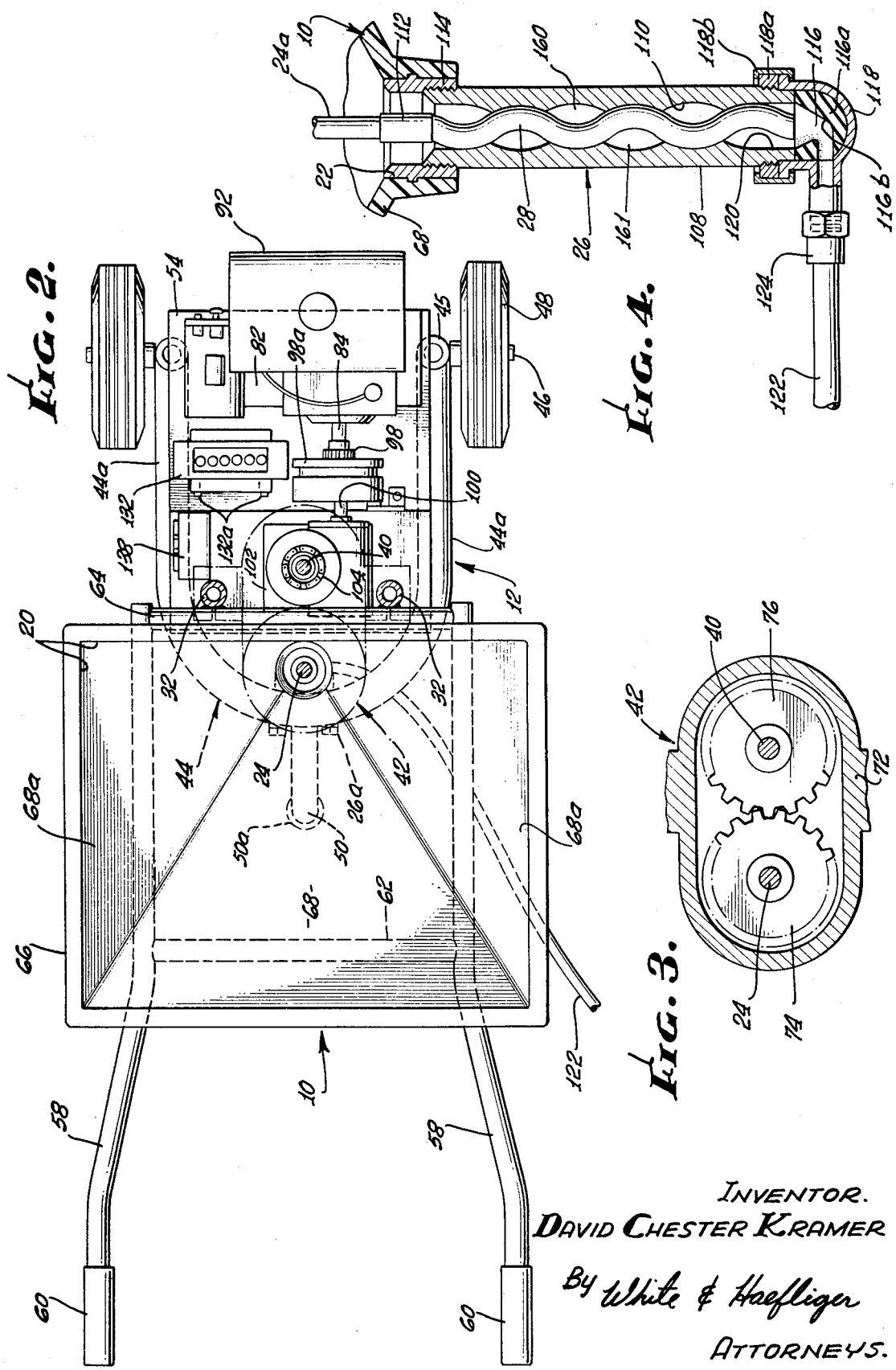
INVENTOR.
DAVID CHESTER KRAMER
BY White & Haefliger
ATTORNEYS.

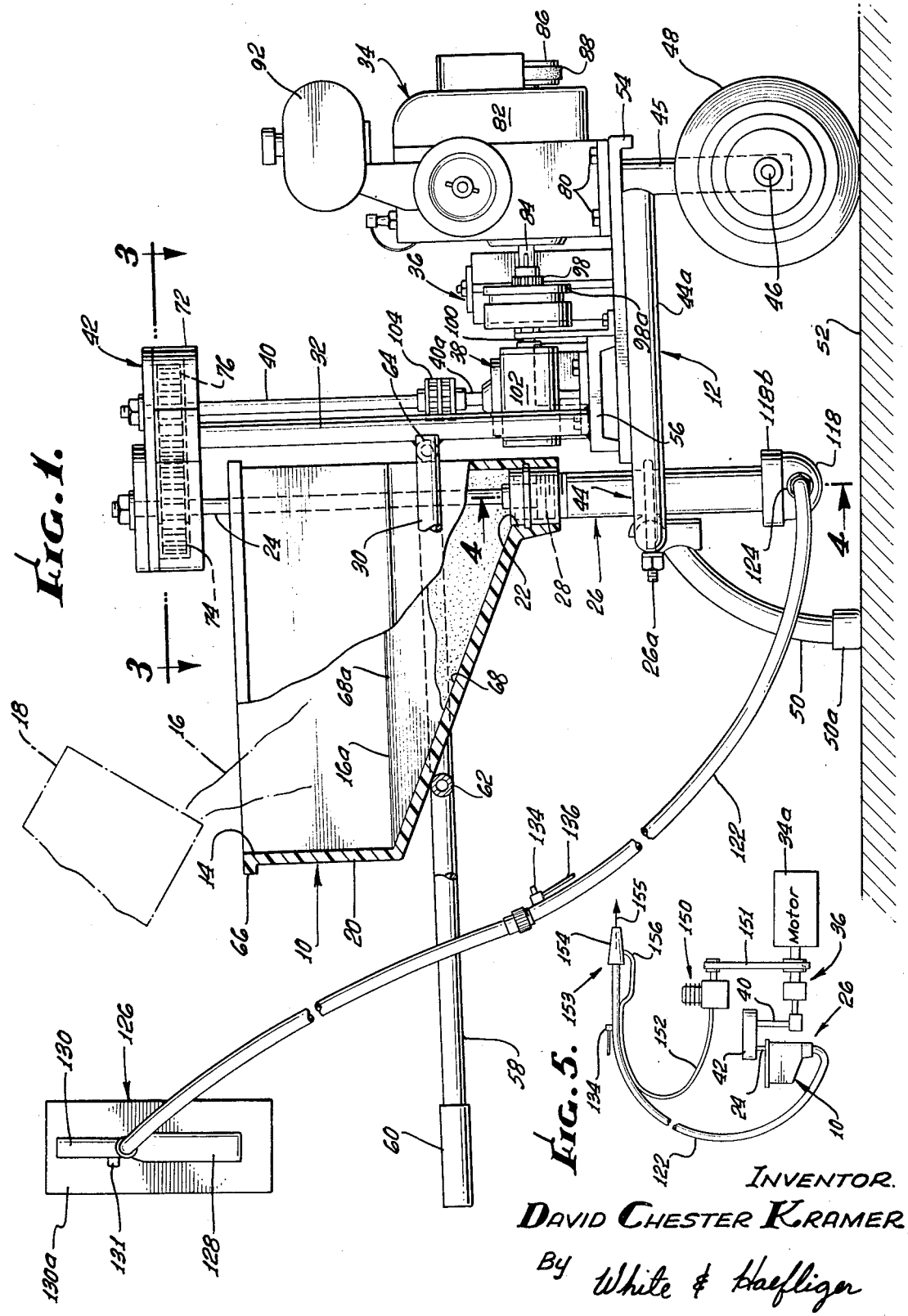

United States Patent Office

3,510,924
Patented May 12, 1970

3,510,924
TROWELING PLASTER DELIVERY APPARATUS
David Chester Kramer, Redondo Beach, Calif., assignor to Trowel Fast, Inc., Azusa, Calif., a corporation of California
Filed Mar. 21, 1967, Ser. No. 624,836
Int. Cl. E04f 13/00
U.S. Cl. 25—104.5       7 Claims

ABSTRACT OF THE DISCLOSURE

Apparatus is provided for controllably delivering liquid plaster to a dispensing head including a carriage, a hopper supported on the carriage to have a relatively large inlet opening upwardly for reception for plaster or plaster forming materials and an upright wall and a lower outlet toward which plaster in the hopper gravitates; a generally upright shaft penetrating downwardly within the hopper through the plaster surface level toward the outlet in closely spaced relation to the upright hopper wall; a pump housing and a cooperating plaster displacing member at the outlet to receive plaster from the hopper interior and means provided on the carriage to support the shaft from above the plaster surface level and to controllably displace the shaft for plaster delivery which means are so constructed and arranged that the maximum extent of the hopper inlet remains vertically unobstructed.

BACKGROUND OF THE INVENTION

Field of the invention

This invention is concerned with apparatus for controllably delivering liquid plaster from a supply maintained in a hopper to a point of application more or less remote to the hopper by pumping the liquid plaster from the supply to a dispensing head at the application point. Plaster, by which term is meant to be included hydraulic or cementitious materials which set from a semi-liquid or slurry state by loss of water, is a widely used architectural material for forming vertical and horizontal interior and exterior surfaces. The actual application is accomplished with a troweling head which may be loaded manually from a hod or, more efficiently, fed by a pumping mechanism connected to the trowel face through a flexible delivery tube. The invention is concerned with improvements in pumping apparatus for delivery of plaster to a troweling head.

Description of the prior art

Plaster is generally prepared in a trough or hopper from water and dry mix by a folding operation in which increasing quantities of the dry mix are exposed to be co-mingled with water to form a relatively viscous liquid. During use, the plaster is periodically reagitated to prevent uneven advancement of the plaster to the set condition. The preparation and maintenance of a sitable plaster mix requires that the mix within the hopper be easily accessible. Previously known plaster delivery devices have curtailed the amount of free space available at the hopper inlet, with a resulting loss in handling flexibility and operating convenience. Moreover, the bearing for the plaster displacing device cannot be exposed to the abrasive plaster, since it will then quickly be destroyed. These limitations have imposed serious problems in the past.

SUMMARY OF THE INVENTION

The above problems as well as others are eliminated in the present invention by an apparatus for controllably supplying liquid plaster to a troweling head comprising a carriage, a hopper supported on the carriage to have a relatively large inlet opening upwardly for reception of plaster or plaster forming materials into the hopper, the hopper having an upright wall and a lower outlet toward which plaster in the hopper gravitates, a generally upright pumping shaft penetrating downwardly within the hopper from above the plaster surface level therein toward the outlet and in closely spaced relationship to the hopper wall, a pump housing at the outlet to receive plaster from the hopper and a plaster displacing member in the pump housing connected to be displaced by the shaft, and means on the carriage to support the shaft from above the plaster surface level and to controllably displace the shaft when plaster is to be delivered, the major extent of the hopper inlet remaining vertically unobstructed by the shaft and shaft supporting and displacing means.

The carriage may comprise a frame having a vertically extending member located forwardly of the hopper, and a generally upright driving shaft may also be provided exteriorly of the hopper drivably interconnected with the pump shaft through a gearbox which is supported above the surface level of the plaster and adjacent the upright hopper wall by the vertically extending carriage frame member. Also, the pump housing is typically in open communication with the hopper outlet and generally positioned therebelow for receiving plaster therefrom and sized to receive downward penetration of the plaster displacing member.

Means for selectively displacing the plaster delivery member are provided which may include a shaft-driving motor conveniently mounted on the carriage forwardly of the hopper, and clutch means, between the motor and the hopper, for selectively transmitting motor power through the driving shaft and pump shaft to the plaster displacing member.

Advantageously, in certain embodiments of the present invention, the pumping shaft is bearing supported only at the gearbox eliminating bearings below the plaster surface level. The pump housing, which may receive the plaster displacing member in the form of a vertical continuation of the pumping shaft, typically includes an open ended stator having an interior helical channel in which the plaster displacing member will comprise a complementary helical rotor for pumping abrasive slurred materials axially. The stator may be comprised of material which, relative to the rotor material, is flexible such an elastomeric material, e.g. rubber with a metal rotor.

Control means can be provided for selectively operating the plaster displacing member. Where the clutch is electrically actuated, e.g. an electromagnetic clutch, a power supply such as a storage battery is electrically connected to the clutch means through a control switch which may be supplied at the clutch location or remotely, e.g. near the troweling head, which head is generally connected to the outlet of the pump housing by a tubular delivery means such as a flexible hose.

Additional objects include provision for compressed air injection into plaster at a dispensing head; and provision of a fitting usable in the plaster delivery line and defining a turn that is lined with resilient material having a bore taper that absorbs plaster pulsation and prevents clogging.

DESCRIPTION OF THE DRAWINGS

In the drawings FIG. 1 is a side view in elevation of one embodiment of the present apparatus shown with a troweling head and associated plaster delivery tube;
FIG. 2 is a plan view of the apparatus shown in FIG. 1;
FIG. 3 is a view taken along line 3—3 in FIG. 1;
FIG. 4 is an enlarged sectional view of the pump housing and plaster displacing member taken along line 4—4 in FIG. 1; and FIG. 5 is a view showing modified apparatus.

DESCRIPTION OF THE PREFERRED EMBODIMENT

Referring to FIGS. 1 and 2 the apparatus is seen to include a hopper 10, supported on a carriage 12, and provided with a relatively large inlet 14 opening upwardly for reception of plaster or plaster forming materials 16, shown in phantom outline to be supplied from sack 18, into the hopper, an upright wall 20 and a lower outlet 22 toward which plaster 19 in the hopper gravitates. Penetrating downwardly within the hopper from above the level of plaster surface 16a toward the outlet 22 is generally upright pumping shaft 24, in closely spaced relation with the wall 20. A pump housing 26 is provided at the outlet to receive plaster from the hopper interior, and a plaster displacing member in the form of a rotor 28 is located in the housing to be displaced by the shaft, e.g. rotated thereby. Means provided on the carriage to support the pumping shaft from above the level of the plaster typically includes the gearbox 42 and a frame 30 having one or more vertically extending members such as posts 32 carrying the gearbox. Means to be described more fully hereinafter, are provided to controllably displace the shaft 24 when plaster is to be delivered, including a motor 34, clutch means 36, a speed reducing gear train 38, driving shaft 40 and gearing in gearbox 42. The structure is arranged so as to leave the major extent of the inlet 14 vertically obstructed.

The frame 30 is seen to comprise a generally U-shaped platform 44 of tubular steel or aluminum stock from which a pair of wheel supporting struts 45 extend downwardly to receive axles 46 on which wheels 48 are mounted. A platform foot 50 also of tubular stock is secured at the rear of the platform and carries a slip-resistant cap 50a, forming a tripod with the wheels for stable placement of the apparatus even on irregular surfaces. The arms 44a of the platform extend forwardly of the hopper 10 in generally parallel alinement and in the same horizontal plane spaced above horizontal support surface 52. Above the wheels and extending rearwardly is a mounting plate 54 rigidly secured to the platform by welding or otherwise. The upright frame members, parallel posts 32, extend upwardly from pedestal 56 which is secured to the mounting plate by means not shown. The posts 32 are joined approximately intermediate their ends by an arrangement for lifting the foot from the ground and guiding forward movement of the apparatus on wheels 48. Such structure includes longitudinal members 58 rearwardly diverging somewhat and terminating in handle grips 60, and forwardly being generally parallel and joined by intermediate cross piece 62 and terminal cross plate 64. The terminal cross piece is secured, e.g. by welding, to the generally upright posts 32 to form a rigid portable frame for the apparatus.

The hopper 10 is generally rectangular, having four generally upright walls 20 suitably of molded glass fiber and resin construction, with a lip 66. The hopper has bottom walls 68 and 68a contoured to fit within the space defined by the handle arrangement and preferably within the rectangle formed by the parallel portions of longitudinal members 58 and transversely parallel cross pieces 62 and 64. To this end and to assure gravity flow of plaster slurry to a relatively small area in the hopper, the bottom walls are generally sloped forwardly and laterally inwardly toward the outlet 22.

Closely spaced and parallel to the front wall of the hopper, the pumping shaft 24 projects downwardly toward the lowermost portion of the hopper bottom and the outlet formed therein. The shaft extends a length sufficient to connect to the plaster displacing rotor 28 in pump housing 26 at the shaft lower end and to rise above the lip 66 of the hopper at the shaft upper end.

Means are provided for operating the pumping shaft, including the generally upright driving shaft 40 forwardly exterior and generally parallel to the hopper front wall and a pair of mating spur gears 74 and 76 fixed to shafts 24 and 40 respectively to drivably interconnect these shafts. The gears are contained within a gearbox 42 that includes housing 72 within which the upper terminal of shaft 24 is bearing supported. Posts 32 of the frame support the gearbox above the surface of the plaster and adjacent the hopper wall as shown. The driving shaft 40 is in turn driven by motor 34 secured to the mounting plate by fasteners 80 forwardly of the hopper. The drive includes clutch means 36 also secured to the mounting plate for selectively transmitting power from the motor through gear train 38 to the driving shaft.

In detail, the power train to the pumping shaft includes a gasoline powered motor 34 enclosed in housing 82, and having horizontal output shaft 84 extending rearwardly, flywheel 86 and belt 88 forwardly, and the fuel tank 92 located at the top of housing 82. The output shaft carries key and spline clutch elements 98 adapted to be engaged by electromagnetically induced relative movement of part 98a adapted to be engaged by electromagnetically induced relative movement of part 98a along the axis of the output shaft. The clutch output shaft 100 is connected with a worm arrangement (not shown) within gearbox 102 for transmitting motor produced rotation at right angles to the motor output shaft and upwardly to the common gearbox 42. A chain linkage 104 is provided between the gearboxes to couple gearing output shaft 40a with drive shaft 40. The drive shaft is fixed to spur gear 76 and thus drives spur gear 74 engaged therewith and hence the pumping shaft 24 fixed to gear 74.

As seen in FIG. 4, the lower end 24a of the pumping shaft 24 is connected to a plaster displacing rotor 28. The rotor is received in pump housing 26 below the outlet 22 and in open communication therewith for receiving plaster 16, the housing being connected to platform 44 as by U-bolt 26a. Again with reference to FIG. 4, the pump housing comprises a stator 108 having an interior helical channel 110 adapted to enclose and preferably embrace auger-shaped rotor 28 and be formed of a material relatively flexible as compared with the rotor, e.g. rubber or other elastomeric material for use with a steel rotor. Rotation of the auger advances the plaster forwardly in slugs, as at 160 and 161 in FIG. 4.

The hopper outlet 22 is formed in the lowermost portion of the hopper bottom 68 to receive, gravitationally, the plaster contents of the hopper. The pumping shaft extends from above the plaster surface level, actually from gearbox 42, to the outlet. There coupler 112 joins the shaft end 24a and plaster displacing rotor 28 within the pump housing. A bushing 114 is provided to adapt the hopper outlet to the pump housing outside dimension. The pump housing leads downwardly to a plenum chamber 116 formed in elbow 118 threaded onto the housing with gasket 118a within cap 118b connecting the pump housing outlet 120 with flexible delivery hose 122 secured to the elbow by coupling 124. The elbow defines a turn containing a liner 116a of soft resilient material such as soft rubber, the liner defining a tapered bore 116b extending lengthwise of the turn. It is found that the liner deflects to absorb plaster slurry pulsation and to expel the plaster upon liner expansion, also, it reduces the tendency of plaster to plug up the elbow, and the latter does not have to be removed for cleaning. The taper of bore 116b also acts to smoothly reduce the flow cross section to the bore size of coupling 124.

The delivery hose leads to a more or less remote troweling head 126 comprising a handle 128 and a plaster manifold 130 for selectively delivering the plaster to the trowel working face at the opposite side of blade 130a. A valve plate is movable by finger control of lug 131 to control plaster flow through openings in the blade 130a.

Control means for determining the delivery of plaster to the troweling head are provided to be operable in conjunction with the electrically actuated with the electrically actuated clutch means above described. The control includes a power supply in the form of storage battery 132 having terminals 132a and a switch 134 for completing a circuit between the battery and the clutch. In the embodiment shown, the control switch is mounted on the delivery hose for convenient operation with one hand while holding the trowel with the other. Conductor wire 136 leads from the switch to control box 138 and from the box to the clutch for completing the clutch actuating circuit.

In operation, plaster or plaster forming materials 16 are dumped into the hopper 10 and prepared for application. The troweling head 126 is brought to the work surface and the control switch 134 closed to start plaster pumping into the delivery hose. Thus, when the actuating switch closes, current flow from the battery 124 to the clutch 36 causes the clutch elements to engage. Plaster received within the pump housing by gravity feed from the hopper is driven downwardly away from the hopper outlet 22, through the pump housing outlet 120 and along the delivery hose 122 to the troweling head.

Release of the control switch opens the circuit, disengaging the clutch elements and stopping the pumping shaft providing plaster delivery By virtue of having the motor and clutch means mounted forwardly of the hopper and the pumping shaft entering downwardly into the hopper expensive and troublesome seals through the hopper walls have been eliminated, and yet, there is ample open area above the hopper for manipulating the plaster because the driving shaft and pumping shaft are closely spaced to enter a common gearbox supported by the carriage from and straddling the hopper wall to provide pumping action from above without occupying any great portion of the hopper inlet.

FIG. 5 illustrates schematically a modified form of the invention incorporating an air compressor 150 driven continuously by the motor 34a as by a belt drive 151. A line 152 conveys compressed air to the head 153 that includes a nozzle 154, so that the compressed air may be injected at 156 into the plaster to forcibly blow the plaster in a directed stream 155 from the head. The remainder of the apparatus indicated generally at 160 may be the same as the structure in FIG. 1.

I claim:

1. Apparatus for controllably supplying liquid plaster to a dispensing head comprising a carriage, a hopper supported on the carriage to have a relatively large inlet opening upwardly for reception of said plaster or plaster forming materials into the hopper, the hopper having an upright wall and a lower outlet toward which plaster in the hopper gravitates, a generally upright pumping shaft penetrating downwardly within the hopper from above the plaster surface level therein toward said outlet and in closely spaced relation to said wall, a pump housing at said outlet to receive plaster from the hopper interior and a plaster displacing member in said housing and connected to be displaced by the shaft, and means on the carriage to support the shaft from above the said plaster surface level and to controllably displace the shaft when plaster is to be delivered, the major extent of said inlet remaining vertically unobstructed by the shaft and shaft supporting and displacing means, said carriage comprising a frame having a vertically extending member located forwardly of the hopper, and said means including also a generally upright driving shaft forward of the hopper and gearing to transmit rotation from the driving shaft to the pumping shaft, said gearing being supported above the surface level of the plaster and adjacent said wall by said frame member, the pump housing being located below and in open communication with said outlet for receiving plaster therefrom and the plaster displacing member being supported by the pumping shaft for rotation in said housing, the pump housing defining a stator having an interior helical channel and the plaster displacing member comprising a complementary helical rotor.

2. Apparatus for controllably supplying liquid plaster to a dispensing head including a troweling blade, a carriage, a hopper supported on the carriage to have a relatively large inlet opening upwardly for reception of said plaster or plaster forming materials into the hopper, the hopper having an upright wall and a lower outlet toward which plaster in the hopper gravitates, a generally upright pumping shaft penetrating downwardly within the hopper from above the plaster surface level therein toward said outlet and in closely spaced relation to said wall, a pump housing at said outlet to receive plaster from the hopper interior and a plaster displacing member in said housing and connected to be displaced by the shaft, and means on the carriage to support the shaft from above the said plaster surface level and to controllably displace the shaft when plaster is to be delivered, the major extent of said inlet remaining vertically unobstructed by the shaft and shaft supporting and displacing means, said carriage comprising a frame having a vertically extending member located forwardly of the hopper, and said means including also a generally upright driving shaft forward of the hopper and gearing to transmit rotation from the driving shaft to the pumping shaft, said gearing being supported above the surface level of the plaster and adjacent said wall by said frame member, the pump housing being located below and in open communication with said outlet for receiving plaster therefrom and the plaster displacing member being supported by the pumping shaft for rotation in said housing, tubular delivery means communicating between the outlet of the pump housing and said head, said delivery means including a duct defining a sharp turn, and a resilient liner in said turn and having a bore which tapers in the flow direction along the length of the turn and at a location to resiliently deflect for cushioning the pulsations of liquid plaster produced by said plaster delivery member.

3. Apparatus according to claim 2 including a gearbox containing said gearing and supporting by said frame member, the pumping shaft being suspended from said gearbox.

4. Apparatus according to claim 1, in which the stator consists of flexible material that deflects in response to rotation of the rotor.

5. Apparatus according to claim 1, in which said stator is formed of elastomeric material and said rotor is metallic.

6. Apparatus according to claim 1 including a motor on the carriage to rotate said driving shaft, an air compressor connected to be continuously driven by the motor, and a compressed air line connected to deliver compressed air from the compressor to said head for blowing the plaster in a directed stream from the nozzle.

7. Apparatus according to claim 2, including a motor on the carriage, an electrically energizable clutch operatively connected between the motor and driving shaft for selectively rotating said driving shaft, and clutch control means including a control switch mounted on said tubular delivery means.

References Cited

UNITED STATES PATENTS

| 2,856,952 | 10/1958 | Stillwagon | 137—375 X |
| 3,140,801 | 7/1964 | Delligatti | 25—104.5 X |
| 2,820,672 | 1/1958 | Arce et al. | 25—104.5 X |

FOREIGN PATENTS

| 322,157 | 7/1957 | Switzerland. |

J. HOWARD FLINT JR., Primary Examiner

U.S. Cl. X.R.

137—375